United States Patent Office 2,824,365
Patented Feb. 25, 1958

2,824,365

SOLDERING OF ALUMINUM BASE METALS

George F. Erickson, Chicago, Ill., assignor to the United States of America as represented by the United States Atomic Energy Commission No Drawing. Application November 18, 1953
Serial No. 393,025

5 Claims. (Cl. 29—492)

This invention deals with the soldering of aluminum or aluminum base alloys (hereinafter broadly referred to as "aluminum metals") to each other or to metals of different types, such as copper, brass and iron.

Heretofore, for soldering aluminum metals with a soft solder, it was found necessary, for instance, first to apply a layer of tin-zinc alloy to the surface to be joined to the other metal, thereafter to superpose a layer of tin and finally to apply the soft solder proper consisting of a lead-tin alloy. This process requires heating of the aluminum metal to about 400° C. in order to obtain a good liquid flow of the tin-zinc alloy. Each of the following layers, however, requires a lower temperature than its preceding layer, and it was found rather difficult and tedious to control the temperatures for the various steps of the process.

The use of the relatively high temperature of 400° C. was also found to bring about undesirable changes in the aluminum metals; for instance, an oxide film forms on the surface of the aluminum and this oxide film greatly impairs the quality of the soldering bond. Furthermore, when it becomes necessary to solder parts to members of a relatively large structure without removing these members from the structure, it is not feasible to heat such elements to as high a temperature as 400° C. and also accurate temperature control becomes extremely difficult.

It is an object of this invention to provide a process of soldering aluminum metals whereby the above-mentioned drawbacks are overcome.

It is another object of this invention to provide a process of soldering aluminum metals which makes the use of relatively low soldering temperatures possible.

It is also an object of this invention to provide a process of soldering aluminum metals in which the temperatures necessary can be adjusted without difficulty.

It is another object of this invention to provide a process of soldering aluminum metals by which a strong and durable bond is obtained.

It is still another object of this invention to provide a process of soldering members of aluminum metal of relatively large structures whereby the soldering can be carried out in situ.

Another object of this invention is an article at least one part of which consists of aluminum metal and the other part is bonded to said first-mentioned part by means of a specific aluminum alloy.

Still another object of this invention is an aluminum alloy which has good bonding properties for aluminum metals to soft solders.

These and other objects are accomplished by heating the member of aluminum metal to be soldered to another metal to slightly above 30° C., rubbing a small amount of metallic gallium into the part of the surface of said member to be combined with said other metal whereby an aluminum-gallium alloy forms on the surface, heating the member to the melting point of lead-tin soft solder, applying lead-tin soft solder to said alloyed surface, and combining the member with said other metal.

It is advantageous to subject the aluminum metal member to a cleaning process prior to alloying it with gallium. This may be carried out by any means known to those skilled in the art, for instance, by rubbing the aluminum metal with a fine steel wool.

The preferred temperatures of the aluminum metal for alloying with gallium range between 30 and 50° C. At these temperatures the aluminum-gallium alloy is in molten condition. It is advisable to exclude moisture during the application of gallium because the formation of the alloy and/or the quality of the bond might otherwise be slightly impaired. If the gallium is applied by hand, immediate contact is therefore advantageously avoided by using rubber gloves or other moisture-impermeable means.

In some instances, particularly when the amount of gallium applied was relatively high, some of the gallium-aluminum alloy formed crumbles off the surface. These crumbs are advantageously wiped off prior to the soldering proper.

The temperature to which the aluminum has to be brought prior to the soft soldering is, of course, dependent upon the solder used. A lead-tin alloy in the proportion of about 60% by weight of tin and 40% of lead has been found highly satisfactory; it requires a temperature of between about 180 and 200° C.

The strength of the bond can still be furthermore improved by applying a coating of tin to the aluminum-gallium surface prior to putting on the lead-tin soft solder. In this instance, the temperature is raised above the melting point of the soft solder, preferably to about 240° C. However, this step of providing an intermediate tin layer is optional. The soft solder is preferably used in the form of a rosin-core soft solder.

The joints obtained by the soldering process of this invention have the same strength and durability as those heretofore obtained by the process described above.

It will be understood that the invention is not to be limited to the details given in this specification but that it can be modified within the scope of the appended claims.

What is claimed is:

1. A process of soldering a member of aluminum metal to a metal piece comprising heating the aluminum metal member to slightly above 30° C., rubbing a small amount of metallic gallium into the surface of the part of said member to be combined with said metal piece whereby an aluminum-gallium alloy forms on the surface, heating said member to a temperature of from 180 to 200° C., applying lead-tin soft solder to said alloyed surface, and combining said member with said metal piece.

2. The process of claim 1 wherein said member is heated to between 30 and 50° C.

3. A process of soldering a member of aluminum metal to a metal piece comprising cleaning the surface of said member, heating the aluminum metal member to between 30 and 50° C., rubbing a small amount of metallic gallium into the surface of the part of said member to be combined with said metal piece whereby an aluminum-gallium alloy forms on the surface, wiping the alloyed surface of said member, heating said member to a temperature of between 180 and 200° C., applying lead-tin soft solder to said alloyed surface, and combining said member with said metal piece.

4. A process of soldering a member of aluminum metal to a metal piece comprising cleaning the surface of said member, heating the aluminum metal member to between 30 and 50° C., rubbing a small amount of metallic gallium into the surface of the part of said member to be combined with said other metal piece whereby an aluminum-gallium alloy forms on the surface, wiping the alloyed surface of said member, heating said member to the melting point of tin, applying a tin layer to said alloyed surface, applying lead-tin soft solder to said tinned, alloyed surface, and combining said member with said metal piece.

5. An article of manufacture produced by the process of claim 1.

References Cited in the file of this patent

UNITED STATES PATENTS

| | | |
|---|---|---|
| 733,662 | Lange | July 14, 1903 |
| 781,338 | Heil | Jan. 31, 1905 |
| 2,087,716 | Banscher | July 20, 1937 |
| 2,531,910 | Hensel | Nov. 28, 1950 |
| 2,623,273 | Murray et al. | Dec. 30, 1952 |
| 2,700,623 | Hall | Jan. 25, 1955 |
| 2,717,840 | Bosch | Sept. 13, 1955 |
| 2,754,238 | Arenberg | July 10, 1956 |

FOREIGN PATENTS

| | | |
|---|---|---|
| 683,608 | Great Britain | Dec. 3, 1952 |

OTHER REFERENCES

Thorpe's Dictionary of Applied Chemistry, vol. 5, page 419. Published by Longmans, Green & Company, New York, N. Y. (Copy in Div. 59.)